United States Patent
Viel

(10) Patent No.: US 6,990,184 B2
(45) Date of Patent: Jan. 24, 2006

(54) METHOD AND DEVICE FOR CO-ORDINATING TELECOMMUNICATIONS SERVICES

(75) Inventor: Ronan Viel, Caen (FR)

(73) Assignee: France Telecom, Paris (FR)

( * ) Notice: Subject to any disclaimer, the term of this patent is extended or adjusted under 35 U.S.C. 154(b) by 371 days.

(21) Appl. No.: 10/380,681

(22) PCT Filed: Sep. 13, 2001

(86) PCT No.: PCT/FR01/02852

§ 371 (c)(1),
(2), (4) Date: Mar. 14, 2003

(87) PCT Pub. No.: WO02/23919

PCT Pub. Date: Mar. 21, 2002

(65) Prior Publication Data

US 2004/0014455 A1    Jan. 22, 2004

(30) Foreign Application Priority Data

Sep. 14, 2000  (FR) .................................. 00 11999

(51) Int. Cl.
*H04M 3/42*  (2006.01)
(52) U.S. Cl. ........................... 379/201.02; 379/201.12; 379/207.02
(58) Field of Classification Search ........... 379/201.01, 379/201.02, 201.03, 201.05, 201.12, 207.02, 379/207.11, 207.13, 207.14, 221.08
See application file for complete search history.

(56) References Cited

U.S. PATENT DOCUMENTS

| | | | |
|---|---|---|---|
| 5,920,618 A | * | 7/1999 | Fleischer, III et al. .. 379/221.09 |
| 6,226,516 B1 | * | 5/2001 | Gupta et al. ................. 455/433 |

(Continued)

FOREIGN PATENT DOCUMENTS

| | | |
|---|---|---|
| EP | 374131 | 6/1990 |
| WO | WO 0042760 | 7/2000 |

OTHER PUBLICATIONS

Charles Francis, "VHE Support in the (ISDN Evolved) UMTS Core Network", Draft EG/NA61305 (V1.4.0) (Jun. 1999). (ETSI) European Telecommunications Standards Institute.

(Continued)

*Primary Examiner*—Bing Q. Bui

(74) *Attorney, Agent, or Firm*—Cohen, Pontani, Lieberman & Pavane

(57) ABSTRACT

A method and a system (6) for coordinating the use of telecommunications service providers (7). The method grants a service request submitted by a user (8) to a service provider (7) as a function of the current state of a state diagram of a unique environment of the user (8) and events associated with the service request. The coordination system (6) includes an access module (11), a profile manager module (13), a user agreement module 14 and at least one environment manager (15).

9 Claims, 2 Drawing Sheets

U.S. PATENT DOCUMENTS

| | | | |
|---|---|---|---|
| 6,249,815 B1 * | 6/2001 | Foladare et al. | 709/223 |
| 6,430,276 B1 * | 8/2002 | Bouvier et al. | 379/201.02 |
| 6,463,140 B2 * | 10/2002 | Tuunanen et al. | 379/207.02 |
| 6,532,285 B1 * | 3/2003 | Tucker et al. | 379/207.02 |
| 6,775,367 B1 * | 8/2004 | Lehtinen | 379/201.12 |
| 6,778,651 B1 * | 8/2004 | Jost et al. | 379/201.01 |
| 6,823,056 B1 * | 11/2004 | Hussain | 379/207.02 |

OTHER PUBLICATIONS

"Universal Mobile Telecommunications System (UMTS); Service aspects; Virtual Home Environment (3G TR 22.970 vesion 3.0.1 Release 1999)", ETSI TR 122 970 v3.0.1 (Jan. 2000).

"Digital Cellular Telcommunications System (Phase 2+) (GSM); Universal Mobile Telecommunications System (UMTS), Service aspects; The Virtual Home Environment (3G TS 22.121 version 3.1.0. Release 1999)" ETSI TS 122 121 v3.1.0 (Jan. 2000).

"Service Architecture, version 5.0, Jun. 16, 1997", Tina-C Deliverable (Telecommunications Information Networking Architecture Consortium).

* cited by examiner

METHOD AND DEVICE FOR CO-ORDINATING TELECOMMUNICATIONS SERVICES

This application is a U.S. National Phase Application under 35 USC 371 of International Application PCT/FR01/02852 (not published in English) filed 13 Sep. 2001.

FIELD OF THE INVENTION

The present invention relates to a method and to a system for coordinating the use of telecommunications service providers.

The fields of the invention are those of telecommunications services on distributed system architectures and intelligent networks.

BACKGROUND OF THE INVENTION

Throughout this text, the expression "telecommunications service provider" refers to any service provider accessible to a user from a telecommunications terminal via a telephone network or a computer network, such as a data network of the Internet type, that is run by a telecommunications operator. The telecommunications terminal is either a computer terminal or a telephone terminal. To illustrate the service provider concept, four service providers are listed hereinafter by way of example. A first service provider offers communications with another user, via a link that either carries audio data only or else carries video data also. A second service provider offers consultation of databases. A third service provider offers data processing, for example bank account management. A fourth service provider offers data storage, for example storing a message in a messaging service.

One highly advantageous application of the invention lies in coordinating different telecommunications services executed on behalf of the same user, even if the services are provided by different telecommunications operators. Thus the invention provides a user with a single service agreement guaranteeing consistent execution of different telecommunications services and a generating a single bill for all the services, even if they are in fact provided by different telecommunications operators or service providers.

At present, consumers using different telecommunications services are not always guaranteed consistent execution of the services. If an inconsistency is detected, it is usually referred to as "negative interaction". This problem of negative interaction occurs in particular when services are executed simultaneously or are provided by different telecommunications operators or service providers. Negative interaction may occur if a user accesses a first service provider to communicate via a mobile telephone and a second service provider to access the Internet via a computer terminal and the two service providers are operated by the same telecommunications operator. The user cannot necessarily be sure that use of Internet services via the first communications service provider using a mobile telephone will be identical to or consistent with the use of Internet services via the second service provider, regardless of the capacities of the terminals or the networks themselves. For example, the Internet service provider may fail to recognize that the user is the same person when he accesses the service provider from a mobile telephone and from some other terminal. Each service provider recognizes a user by his user profile, which can include the name of the user, his address, a list of the service providers to which he subscribes, personalized service access profiles, etc. Each service provider defines the content of the user profile that it manages.

Furthermore, each operator offers service providers to which a user can request access, for example by dialing a particular telephone number, an access code, or a telephone card number. If a user requests access to a service provider and the request is validated, the user is assigned a service session, i.e. an access path to the service provider. Once he is using a particular first service provider, the user may wish to use a second service provider. Despite the agreements entered into with the operator, stringing from the first service provider to the second service provider is not always possible or in accordance with the agreements. For example, this kind of situation arises when using a particular kind of telephone card that can be used to make calls from any telephone. The user can access the call service provider associated with the card from any telephone by dialing an access code followed by a code related to the card. The call service provider then enables the user to use that telephone as if it were a private telephone. In particular, the user can interrogate a telephone information service provided by the operator. If the information requested is a telephone number, the service provider can forward the call to that number, even if a direct call to that person is not permitted by the telephone card service provider. Because the agreement between the cardholder and the service provider related to the card defines the conditions of use of the card, in particular the geographical area within which the user can call another party, there is an inconsistency in stringing from the first service provider, relating to use of the telephone card, to the second service provider, forwarding a call from an information service. The information service has no knowledge of the content of the agreement, and in particular of restrictions limiting the geographical areas that can be called, and forwards the call of the cardholder even if the called party is in a geographical area that the user cannot directly call because of the restrictions in his agreement.

Methods known in the art are employed to combat negative interaction between service providers. They define a direct dialogue mechanism between different service providers accessed by the same user. The drawback of those methods is that they impose a common architecture on the service providers and consequently make evolution of the service providers interdependent.

SUMMARY OF THE INVENTION

One object of the present invention is to coordinate the use of telecommunications service providers so as to avoid the problem of negative interaction between different telecommunications service providers that the same user wishes to access.

This and other objects are attained in accordance with one aspect of the present invention directed to a method that, on each request for access to a service provider from a user, activates a unique environment that includes a profile of said user and service sessions associated with said user, and processes validation of the service provider access request. Each service provider whose access request is validated is assigned a unique session forming part of the unique environment of the user, and the unique environment is managed by modeling the states that the environment of the user can take and the relations between its states by means of a state diagram in which changes of state are triggered by given events, some of which are associated with the services offered by the service providers. A service request submitted by a user to a service provider having a session is granted as a function of the current state of the state diagram of the environment of the user and events associated with the service request, and the environment of the user is updated on proceeding to the next state of the state diagram of the service provider.

Another aspect of the present invention is directed to a system for coordinating the use of telecommunications service providers when the use of a service provider is invoked by a user from a telecommunications terminal and the telecommunications service providers are connected to the coordination system by a network. The coordination system includes an access module, constituting a first entry point of the coordination system addressed by any service provider, referred to as a requester service provider, which receives an access request from a user. A profile manager module is connected to the access module and includes a user profile and service provider profile database and a profile manager connected to the database. A user agreement module contains a list of agreements with the telecommunications service providers entered into by the users, information on the telecommunications service providers, and a list of access and service charges. At least one environment manager is connected to the profile manager module and the user agreement module, constituting a second entry point to the coordination system addressed by any service provider whose access request is validated.

The coordination method and system of the invention solve the stated problem, because centralized management of the user environment associates a user with a single environment address which corresponds to an environment manager. The environment manager dialogues with all of the service providers that the user wishes to access and updates at least one state diagram that is characteristic of the environment of the user and evolves as a function of the service providers the user accesses and the services that the user requires of those service providers.

The coordination method and system provide the service providers with the information that they need provided that the information can be shared without risk. The coordination method and system thus prohibit a loss of consistency between the data characterizing the user and his environment and guarantee blocking of access to confidential data. They effect operations on behalf of the service providers, guaranteeing compliance with agreements between the service provider and a client. The client and the user can be the same individual or different individuals, or the client can be a body corporate and designate one or more users who are either individuals or bodies corporate.

Knowing the environment of the user at all times enables the coordination method and system to supply the current location of the user, i.e. his address on the network. This location function can be based on one or more existing servers, such as a GSM network's home location register (HLR).

The invention solves the problem of negative interaction by means of a dialogue between the coordination system and each of the requester service providers. Thus service providers can evolve independently of each other.

The coordination method and system of the invention have the advantage that they do not impose a particular development platform, either on the coordination system or on the service providers. Nor do the method and system impose a common architecture on the requester service providers.

The coordination method and system of the invention can advantageously identify and/or authenticate the user.

BRIEF DESCRIPTION OF THE DRAWINGS

Other features and advantages of the invention become apparent on reading the following description of particular embodiments of the invention. The description is given with reference to the accompanying drawings, which are provided by way of non-limiting example.

DETAILED DESCRIPTION OF THE DRAWINGS

The context of the invention is as follows. A user seeks to use one of several telecommunications service providers from a telecommunications terminal. The telecommunications service providers are connected by a telephone or computer network to a coordination system which implements a method in accordance with the invention which coordinates the use of telecommunications service providers and administers a centralized user profile base.

Figure 1:
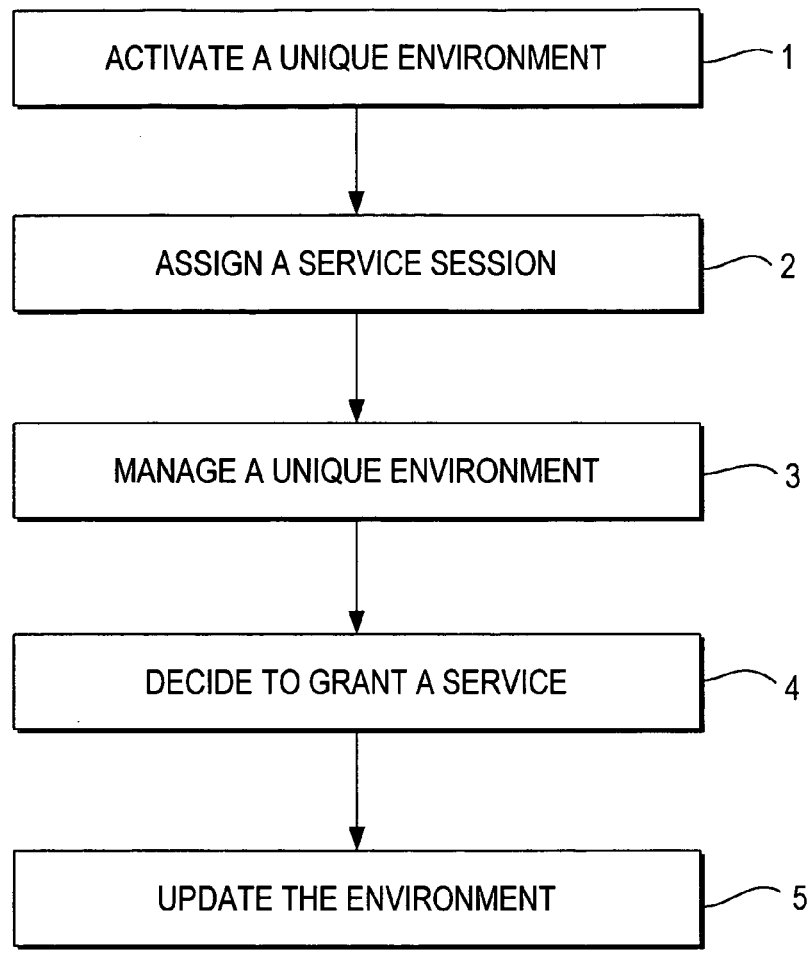
FIG. 1 is a flowchart of a method of the invention.

The method of the invention for coordinating the use of telecommunications service providers includes the steps described below and shown in FIG. 1.

In a first step 1, a unique environment (created as described below in connection with FIG. 2) based on the user profile is activated on each request by a user to access a service provider. If an environment has already been activated for that user, it is used for the remainder of the processing. The method also processes validation of the request to access the service provider. The access request is refused, i.e. not validated, if the user cannot use the service provider. There are various reasons why a user can be unable to use a service provider. They might be dictated by an agreement between the user and the service provider operator or related to conditions of use of the service provider. For example, a given service provider might be accessible only from certain terminals.

In a second step 2, a unique service session is assigned to each service provider whose activation has been validated. The session is then part of the unique environment of the user.

In a third step 3, the unique environment of the user is managed by modeling the states that the environment of the user can take and the relations between those states, using a state diagram in which changes of state are triggered by given events, some of which are associated with services offered by the service providers. The following example corresponds to one particular embodiment in which the environment is managed using a plurality of state diagrams. There is a state diagram for each service session and the environment is associated with another state diagram. The states of a state diagram always include a start state and an end state. The states between these two states depend on the modeling of either the service provider or the environment. For example, an initial state, a charge metering authorization state, and a charge metering state can be defined in the state diagram of a service provider. The initial state is reached from the start state after receiving a request from a user to access the service provider. The charge metering authorization state is reached from the initial state after the service provider access request is validated. The charge metering state is reached from the charge metering authorization state after the service request submitted by the user is granted.

The final state is reached from the initial state, charge metering authorization state and charge metering state after the decision is taken to interrupt use of the service provider. The decision can result from an action of a user wishing to interrupt use of the service provider himself or it can be taken by the method as a function of conditions of use of the service provider, as a function of an agreement, or as a function of the amount of credit granted to the user.

In a fourth step 4, authorization is granted to a service request submitted by a user to a service provider, to which a service session has been assigned, as a function of the current state of the state diagram of the environment of the user, as a function of specifications of use of the service provider indicated in the agreement, and as a function of the nature of the service request and the events associated with the request.

In a fifth step 5, the environment, in particular the user profile, is updated on proceeding to the next state of the state diagram.

Figure 2:
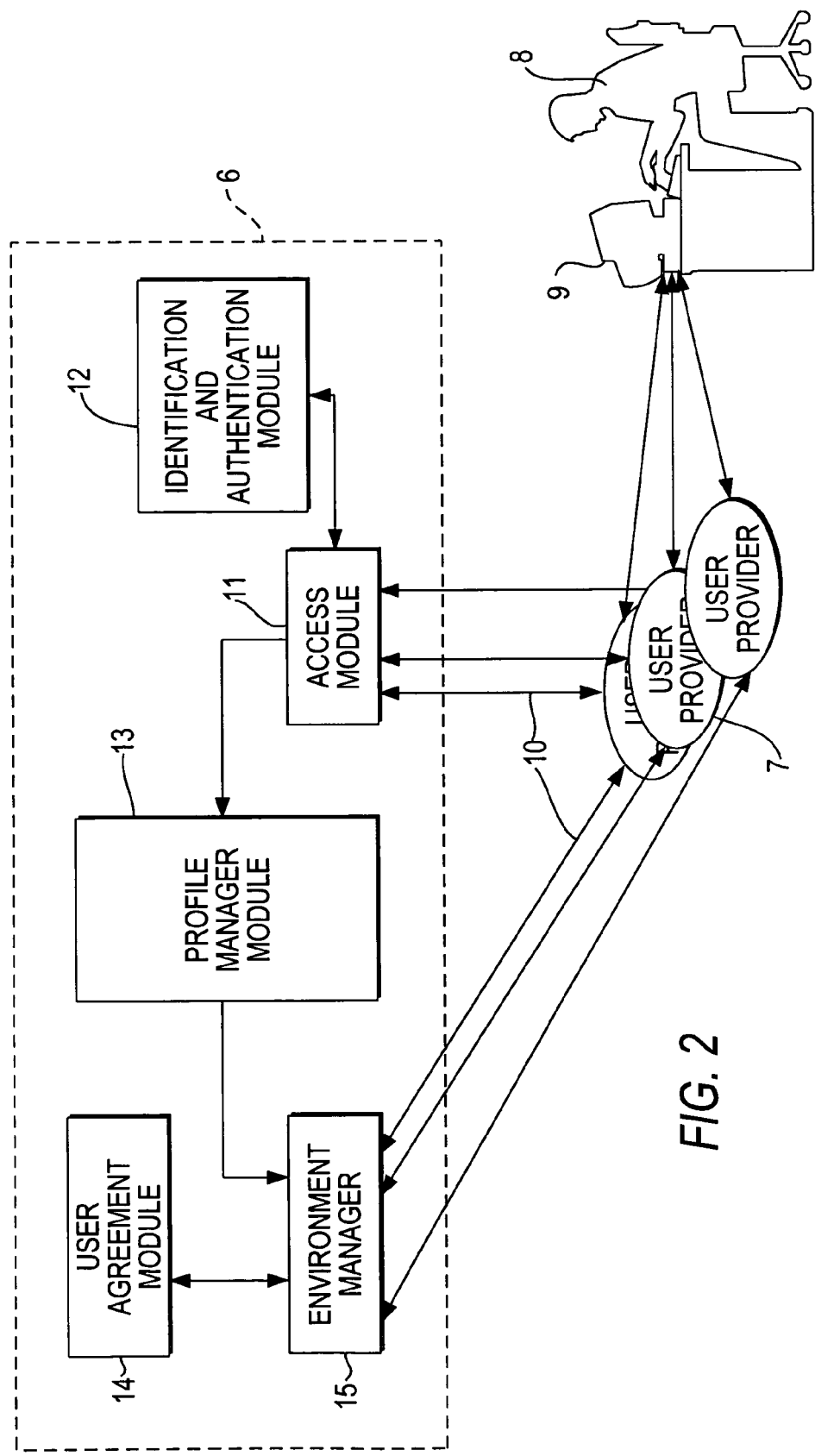
FIG. 2 is a block diagram of a coordination system of the invention.

FIG. 2 is a diagram of a coordination system 6 of the invention which is addressed by a telecommunications service provider 7 when it is invoked by a user 8. The user 8 can invoke one or more telecommunications service providers 7 from a telecommunications terminal 9 such as a landline or mobile telephone or a computer. The telecommunications service providers 7 are connected to the coordination system by a network 10.

The coordination system 6 includes an access module 11, an identification and authentication module 12, a profile manager module 13, a user agreement module 14, and an environment manager 15.

The access module 11 is a first entry point of the coordination system 6, which must be addressed by any service provider 7 that receives an access request from a user 8. The service provider 7 sends the access module 11 a request containing information concerning the identity of the user 8, including at least an identifier and, where applicable, a password, an address, etc., and information concerning the service provider 7, such as characteristics defining the session between the user 8 and the service provider 7, the session address, etc. The access module 11 can be a server or any equivalent means.

The identification and authentication module 12 is connected to the access module 11 and its function is to identify and authenticate the user 8. On the basis of information concerning the identity of the user 8, the identification and authentication module 12 verifies the existence of that identity and authenticates the user 8 for service providers 7 that require authentication, for example verification that a password supplied by the user 8 has previously been assigned to that user. The identification and authentication module 12 communicates the identification and authentication result to the access module 11. The identification and authentication module 12 can be omitted or replaced by an equivalent module external to the coordination system 6. If the identification and authentication module 12 is absent, the user must supply an identifier to access a service provider. In a different embodiment, the identification and authentication functions can be implemented in two separate modules. The identification and authentication module 12 can be installed on the same server as the module 11, on another server or on any equivalent means.

The profile manager module 13 includes a profile manager and a profile database. The database can be stored in and distributed between local or remote memories. The profile manager module 13 is connected to the access module 11, which supplies it with the identifier of the user 8. The profile manager interrogates the database to obtain the profile that corresponds to the identifier of the user 8 and personalized profiles, if any, of the service providers linked to the profile of user 8. The profile manager creates an environment for the user 8 and supplies it to the environment manager 15, or to one of the environment managers 15 if there is more than one. The profile manager module 13 interrogates the environment manager 15 in charge of the profile of the user and obtains in response a service session identifier specific to the interrogated environment manager 15. The profile manager module 13 communicates the service session identifier and the address of the environment manager 15 in the network 10 to the access module 11, which transmits them to the requester service provider 7. Before creating an environment for the user 8, the profile manager module 13 checks that there is no environment manager already working on the environment of the user 8. If there is, the profile manager module 13 supplies it with the information on the requester service provider 7 so that it can modify the environment of the user 8. In return, the environment manager 15 sends a service session identifier to the profile manager module 13, which the latter communicates, together with the address of the environment manager 15 in the network 10, to the access module 11, which transmits them to the requester service provider 7. The exchanges previously described between the profile manager module 13 and the environment manager 15 guarantee a unique environment for the user 8. The profile manager module 13 can be installed on the same server as the access module 11 and the identification and authentication module 12, on another server or on any equivalent means. The profile database can be stored in a memory of the server of the profile manager module 13 or in separate mass memory.

The environment manager 15 is connected to the profile manager module 13 and the user agreement module 14, and constitutes a second entry point of the coordination system 6. The environment manager 15 carries out various operations on behalf of the service providers based on its knowledge of the utilization context of the service providers that a user 8 can invoke and of the profile of that user 8. In particular, it determines service authorizations, charges to be applied, the cost of a service, and actions to be undertaken with service providers, such as sending a notification and sending a stop instruction, using the user agreement module. The environment manager 15 has its own logic enabling it to conduct the above operations and to dialogue directly with the requester service providers, based on modeling by a state diagram of states that the user environment can take and relations between those states. Changes of state are triggered by given events, some of which are associated with the services offered by the service providers. Each environment manager 15 acts on one or more user environments it has been assigned to manage by the profile manager module 13. The environment manager 15 can be installed on the same server as the profile manager module 13, the access module 11, and the identification and authentication module 12, on another server or any equivalent means.

The user agreement module 14 includes a charging and added value module, a service catalogue module, and a customer management module. The charging and added value module contains a list of charges and of service costs linked to service providers. The service catalogue module contains information describing services, or service use contexts, common to all the users of the system 6 and to their environments. The customer management module contains a list of agreements relating to service providers with which users have entered into an agreement. The information from the user agreement module is useful to the environment manager 15 in deciding whether to grant the user 8 access to the service provided by the service provider 7.

The coordination system 6 can be entirely installed on an intelligent network entity known as the service control point (SCP) or distributed between servers interconnected by a network.

The procedure when a user 8 wishes to access a service provider 7 is as follows: the service provider 7 supplies to the first entry point 11 a first identifier provided by the user. The user 8 is optionally identified and authenticated. Identification or authentication can have a negative or positive outcome. The outcome is negative, for example, if the user 8 is unknown or if the password supplied is incorrect. When the outcome is positive, identification terminates with the supply of a second identifier. Supplying the first identifier or the second identifier, where applicable, activates the profile of the user 8 and automatically sets an indicator which tells the coordination system 6 that the service provider 7 is requesting to be activated on behalf of the user 8. Knowing his profile, the coordination system 6 creates a unique environment for the user, which consists of the profile of the user and the service sessions assigned to him. The coordination system 6 validates the service provider access request or not, as a function of information on the user it obtains from his profile and information it obtains on the service provider, in particular from the user agreement module. It may not validate the request if the service provider is prohibited to the user, for example. After validating the service provider access request, the coordination system 6 supplies the service provider 7 with a unique session that the service provider 7 must use for all subsequent operations, for which the service provider 7 addresses itself to the second entry point 15 of the coordination system 6 with its session at the time of each operation. For example, these are operations that enable the service provider 7 to obtain authorization to provide a service, to obtain information on the user 8, to request stopping or starting of charging for a service, to modify information on the user 8, or to request notification of an event to the user 8, or operations for requesting invocation of another service provider 7 for the user 8 or indicating the end of use of the current service provider 7 on behalf of the user 8.

When the user 8 accesses a service provider 7, the latter must interrogate the coordination system 6:
- if the user 8 requests a service that necessitates location of a user that the service provider 7 wishes to contact,
- if the user 8 requests a service that necessitates personalization to identify the user and obtain information concerning him,
- if the user 8 requests a service that necessitates a payment and an invoice,
- if the user 8 requests a service that leads to him being supplied with information from a domain authorization,
- if the user 8 requests a service that leads to an operation being effected on his behalf necessitating authorization,
- if the ending of a service requested by the user 8 necessitates stopping a payment and an invoice that are time-dependent, or
- at the end of use of the service provider 7 on behalf of the user 8, to indicate that use of the service provider 7 is terminating.

Figure 3:
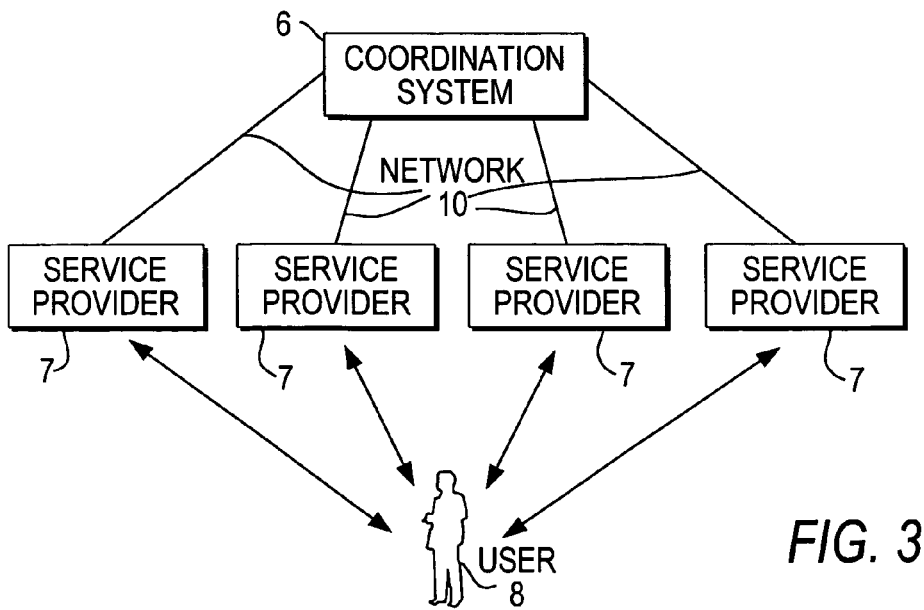
FIG. 3 is a diagram illustrating the use of a coordination system of the invention with multiple service providers.

FIG. 3 is a diagram showing the use of a coordination system of the invention with multiple service providers. A coordination system 6 of the invention coordinates the use of different service providers 7 by the same user 8. Exchanges between the service providers 7 and the coordination system 6 take place via links of the network 10. The service providers 7 that address the coordination system 6 have an interface which dialogues with the entry points of the coordination system 6 and commands accessible to the coordination system 6 enable it to send notifications to the service providers 7 and to monitor them if required. For example, one notification is a warning message to inform the user 8 that almost all his credit is used up. Monitoring is necessary to interrupt a service when the credit of the user 8 is all used up, for example.

A coordination system of the invention is also a multi-user system. It simultaneously coordinates the use of service providers for different users, whether the service providers used by the users are identical or different or overlap.

What is claimed is:

1. A method of coordinating the use of telecommunications service providers when the use of a service provider (7) is invoked by a user (8) from a telecommunications terminal (9), which method is characterized in that it includes the following steps:
    on each request for access to a service provider (7) from a user (8), activating (1) a unique environment, consisting of a profile of said user and service sessions associated with said user (8), and processing validation of the service provider (7) access request,
    assigning (2) each service provider (7) whose access request is validated a unique session forming part of the unique environment of the user (8),
    managing (3) said unique environment by modeling the states that the environment of the user (8) can take and the relations between its states by means of a state diagram in which changes of state are triggered by given events, some of which are associated with the services offered by the service providers (7),
    granting (4) a service request submitted by a user (8) to a service provider (7) having a session as a function of the current state of the state diagram of the environment of the user (8) and events associated with the service request, and
    updating the environment of the user (8) on proceeding to the next state of the state diagram of the service provider (7).

2. A method according to claim 1 for coordinating the use of telecommunications service providers, characterized in that said method further includes the following step:
    on each request from a user (8) to access a service provider (7), identifying the user (8) to an identification module by assigning the user an identifier.

3. A method according to claim 1 for coordinating the use of telecommunications service providers, characterized in that said method further includes the following steps:
    on each request from a user (8) to access a service provider (7), authenticating the user (8) by means of an authentication module, and
    validating the request from the user (8) for access to the service provider (7) as a function of the result of the authentication.

4. A system (6) for coordinating the use of telecommunications service providers (7) by implementing a method according to claim 1 when the use of a service provider (7) is invoked by a user (8) from a telecommunications terminal (9) and the telecommunications service providers (7) are connected to the coordination system (6) by a network (10), which system (6) is characterized in that it includes:
    an access module (11), constituting a first entry point of the coordination system (6) addressed by any service provider (7), referred to as a requester service provider, which receives an access request from a user (8), a profile manager module (13) connected to the access module (11) and including a user profile and service provider profile database and a profile manager connected to the database, a user agreement module (14) containing a list of agreements with the telecommunications service providers (7) entered into by the users (8), information on the telecommunications service providers (7), and a list of access and service charges, and at least one environment manager (15) connected to the profile manager module (13) and the user agreement module (14), constituting a second entry point to the coordination system (6) addressed by any service provider (7) whose access request is validated.

5. A system (6) according to claim 4 for coordinating the use of telecommunications service providers (7), characterized in that said system (6) further includes:

at least one identification and authentication module (12) connected to the access module (11).

6. A server characterized in that it includes a system (6) according to claim 4 for coordinating the use of telecommunications service providers (7).

7. A set of servers interconnected by a network, characterized in that it includes a system (6) according to claim 4 for coordinating the use of telecommunications service providers (7) and in that modules of the coordination system (6) are distributed between the servers.

8. A server characterized in that it includes a profile manager module (13), a user agreement module (14) and an environment manager (15) of a coordination system (6) according to claim 4.

9. A system (6) according to claim 4 for coordinating use of telecommunications service providers (7), characterized in that the network (10) is the Internet.

* * * * *